(12) United States Patent
Ferraro et al.

(10) Patent No.: US 10,657,191 B2
(45) Date of Patent: May 19, 2020

(54) METHOD AND SYSTEM FOR SECURE REMOTE INTERACTION

(71) Applicant: Voconomy Inc., Dallas, TX (US)

(72) Inventors: Christiano Ferraro, Dallas, TX (US); Benson Wong, Brampton (CA)

(73) Assignee: Voconomy, Inc., Dallas, TX (US)

( * ) Notice: Subject to any disclaimer, the term of this patent is extended or adjusted under 35 U.S.C. 154(b) by 0 days.

(21) Appl. No.: 16/244,617

(22) Filed: Jan. 10, 2019

(65) Prior Publication Data
US 2020/0034394 A1 Jan. 30, 2020

Related U.S. Application Data

(60) Provisional application No. 62/711,226, filed on Jul. 27, 2018.

(51) Int. Cl.
*G06F 3/14* (2006.01)
*G06F 16/954* (2019.01)
*H04L 29/06* (2006.01)
*G06F 9/451* (2018.01)

(52) U.S. Cl.
CPC .......... *G06F 16/954* (2019.01); *G06F 3/1454* (2013.01); *G06F 9/453* (2018.02); *H04L 67/38* (2013.01)

(58) Field of Classification Search
None
See application file for complete search history.

(56) References Cited

U.S. PATENT DOCUMENTS

| | | | | |
|---|---|---|---|---|
| 9,716,861 | B1 * | 7/2017 | Poel | H04N 7/15 |
| 10,437,549 | B2 * | 10/2019 | Deenadayal | G06F 21/10 |
| 2004/0139156 | A1 * | 7/2004 | Matthews | G09B 7/00 |
| | | | | 709/204 |
| 2009/0164581 | A1 * | 6/2009 | Bove | G06F 16/954 |
| | | | | 709/205 |
| 2010/0082747 | A1 * | 4/2010 | Yue | G06F 16/954 |
| | | | | 709/204 |
| 2015/0149557 | A1 * | 5/2015 | Mendez | G06F 17/2247 |
| | | | | 709/205 |
| 2015/0278534 | A1 * | 10/2015 | Thiyagarajan | G06F 21/62 |
| | | | | 726/28 |
| 2016/0182721 | A1 * | 6/2016 | Khalatian | H04M 3/5191 |
| | | | | 379/265.09 |
| 2017/0123751 | A1 * | 5/2017 | Sigur sson et al. | H04L 67/02 |
| 2017/0200021 | A1 * | 7/2017 | Patel | G06F 21/6245 |

* cited by examiner

*Primary Examiner* — Beau D Spratt
(74) *Attorney, Agent, or Firm* — Hunt Pennington Kumar & Dula, PLLC

(57) ABSTRACT

Embodiments may include systems, apparatus, and methods for direct onscreen computer system or software navigation and guidance without the need for direct user computer access or control, or the download of any additional software, thereby enabling such navigation and guidance without the risk of exposure of sensitive information from the user device.

20 Claims, 4 Drawing Sheets

```
                                                    400
                                        410     ———
┌─────────────────────────────────────────────────────┐
│       User accesses website or logs into application │
└─────────────────────────────────────────────────────┘
                         │ 420
                         ▼
┌─────────────────────────────────────────────────────┐
│   User unaware how to get to a particular area or functionality │
└─────────────────────────────────────────────────────┘
                         │ 430
                         ▼
┌─────────────────────────────────────────────────────┐
│   User communicates to a company representative via a │
│   communication channel tied to the website or application │
└─────────────────────────────────────────────────────┘
                         │ 440
                         ▼
┌─────────────────────────────────────────────────────┐
│   Company representative targets instance of the user tied to user's │
│                        login ID                      │
└─────────────────────────────────────────────────────┘
                         │ 450
                         ▼
┌─────────────────────────────────────────────────────┐
│  Company representative clicks on the link or object necessary for the │
│  user to click to navigate to the desired area or functionality │
└─────────────────────────────────────────────────────┘
                         │ 460
                         ▼
┌─────────────────────────────────────────────────────┐
│ An image or animation is rendered referencing the (X,Y) coordinates │
│ of the link or object at a suitable location for the image or animation │
│ to be rendered. Z coordinate is chosen with an index to be of highest │
│ priority to keep the image or animation on top of all other displayed │
│             layers creating an overlay              │
└─────────────────────────────────────────────────────┘
                         │ 470
                         ▼
┌─────────────────────────────────────────────────────┐
│ Rendered image or animation is communicated back to the user using │
│   the user's instance over the same communication channel │
└─────────────────────────────────────────────────────┘
                         │ 480
                         ▼
┌─────────────────────────────────────────────────────┐
│  User clicks on the link or object to navigate to the desired area or │
│                        functionality                 │
└─────────────────────────────────────────────────────┘
                         │ 490
                         ▼
┌─────────────────────────────────────────────────────┐
│   Process continues until user reaches the desired area or functionality │
└─────────────────────────────────────────────────────┘
```

FIG. 4

METHOD AND SYSTEM FOR SECURE REMOTE INTERACTION

CROSS REFERENCE TO RELATED APPLICATIONS

This application is related to provisional patent application Ser. No. 62/711,226 entitled DIGITAL PATH DIRECTOR, which is hereby expressly incorporated herein in its entirety.

FIELD OF THE INVENTION

The disclosure relates generally to systems, apparatus, and methods for direct onscreen computer system or software navigation, interaction and guidance without the need for direct user computer access or control, or the download of any additional software, thereby enabling such navigation, interaction and guidance in a secure manner without the risk of exposure of sensitive information from the user device.

BACKGROUND OF THE INVENTION

Onscreen GUI guidance and navigation systems typically include features that allow an operator to see a user screen and/or grant remote access to the user computer. This may be beneficial in order to direct the user on how to use a computer system or a particular piece of software, or even to remotely perform the actions for the user. However, this method of granting an operator the ability to view a user's screen or even control the user's system can have significant drawbacks.

One significant drawback of current screen-share and/or remote access software is that of data security. Typical systems require downloading of some software components on user systems which may expose the user systems to malware and bad actors. It may further require transfer of relatively large data that may consume bandwidth and time. Other traditional typical chat based interfaces lack the graphical capabilities and require the helper to communicate by utilizing typed instructions which are often time consuming and may lack clarity.

The current invention is related to methods, systems and apparatus operable to overcome the challenges associated with traditional screenshare and remote control mechanisms. For reasons stated above and for other reasons which will become apparent to those skilled in the art upon reading and understanding the present specification, there is a need in the art for improved methods and systems to provide guidance, training and remote navigational assistance to users and clients navigating website content or using online systems targeted for specific purposes.

BRIEF DESCRIPTION OF THE INVENTION

The above-mentioned shortcomings, disadvantages and problems are addressed herein, as will be understood by those skilled in the art upon reading and studying the following specification.

This summary is provided to introduce a selection of concepts in a simplified form that are further described below in more detail in the Detailed Description. This Summary is not intended to identify key or essential features of the claimed subject matter.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In one aspect, systems, apparatus, and methods are provided through which guidance may be provided to a user in navigating to the desired content by means of using a secure middle instance of the user's visual and screen. The use of an instance of the user's visual and screen makes local installation of software on user's machine either unnecessary or greatly reduces the size of the payload associated with such code.

In one aspect, systems, apparatus and methods are provided through which multiple users may be assisted by means of a cloud based system using lesser number of operators as compared to users being assisted. In certain embodiments, the operators may be replaced or assisted by trained self-learning systems that are capable of applying artificial intelligence principals for providing such assistance.

Apparatus, systems, and methods of varying scope are described herein. These aspects are indicative of various non-limiting ways in which the disclosed subject matter may be utilized, all of which are intended to be within the scope of the disclosed subject matter. In addition to the aspects and advantages described in this summary, further aspects, features, and advantages will become apparent by reference to the associated drawings, detailed description, and claims.

BRIEF DESCRIPTION OF THE DRAWINGS

The disclosed subject matter itself, as well as further objectives, and advantages thereof, will best be illustrated by reference to the following detailed description of embodiments of the device read in conjunction with the accompanying drawings, wherein:

FIG. 4 is a flowchart illustrating the steps involved in a method 400 to help a user by drawing user's attention by means of animation on user's screen according to an embodiment.

DETAILED DESCRIPTION OF THE INVENTION

Figure 1:
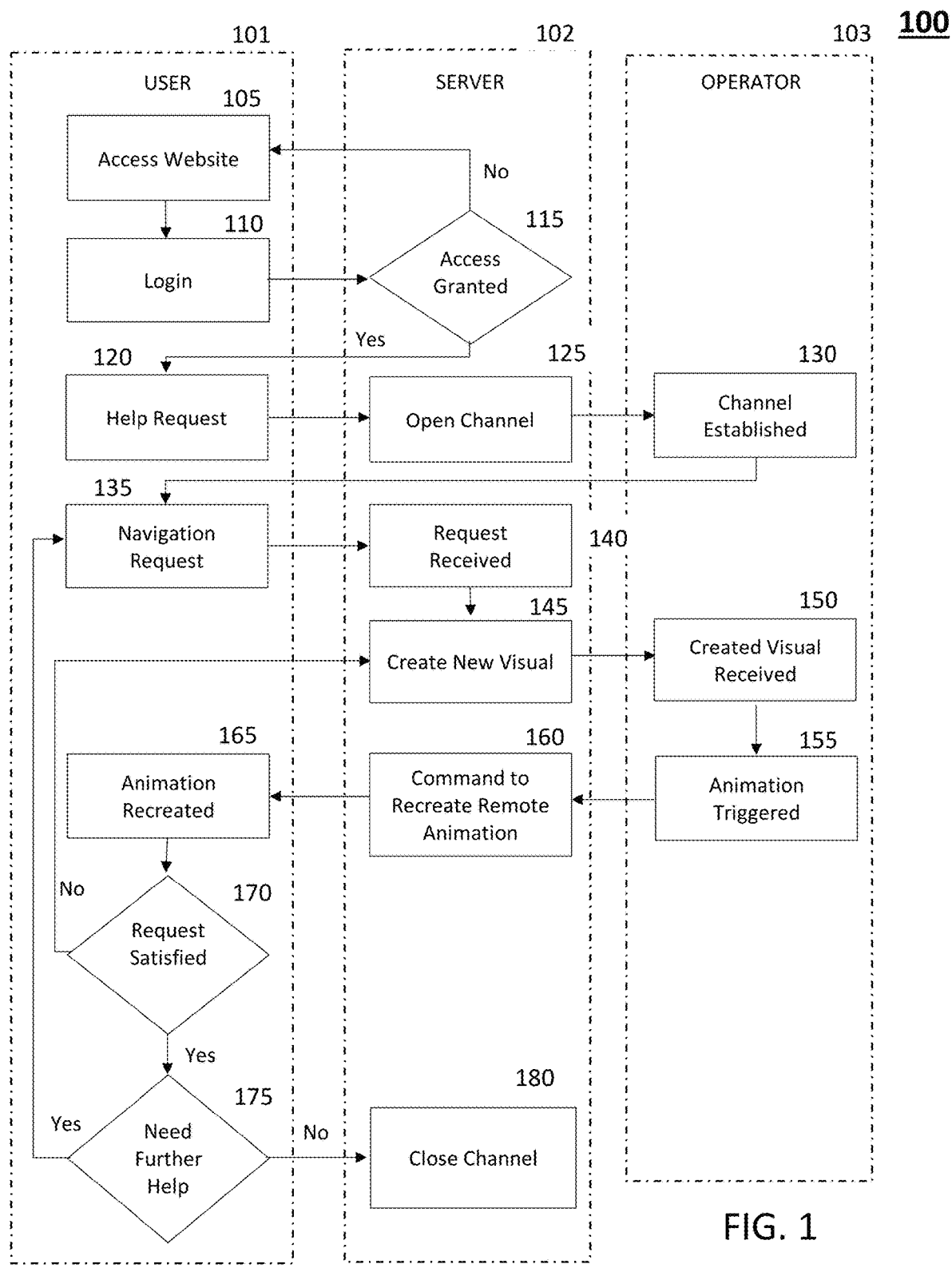
FIG. 1 is a flowchart illustrating a system 100 that implements a method to assist a user remotely and securely according to an embodiment.

In the following detailed description, reference is made to the accompanying drawings which form a part hereof, and in which is shown by way of illustration specific embodiments which may be practiced. These embodiments are described in sufficient detail to enable those skilled in the art to practice the embodiments and disclosure. It is to be understood that other embodiments may be utilized, and that logical, mechanical, electrical, and other changes may be made without departing from the scope of the embodiments and disclosure. In view of the foregoing, the following detailed description is not to be taken as limiting the scope of the embodiments or disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein.

The detailed description set forth herein in connection with the appended drawings is intended as a description of exemplary embodiments in which the presently disclosed apparatus and system may be practiced. The term "exemplary" used throughout this description means "serving as an example, instance, or illustration," and should not necessarily be construed as preferred or advantageous over other embodiments.

FIG. 1 is a flowchart that illustrates the interactions in a system 100 that may implement a method to assist a user remotely and securely according to an embodiment. FIG. 1 as illustrated comprises of a user 101 computer, a server 102 and an operator 103 computer. It will be understood that in embodiments, these components, i.e. the user 101 computer, server 102, or the operator 103 computer, as an example and not as a limitation may be a traditional computer, a mobile device, a smartphone, a tablet, notebook, netbook, smart speaker, internet of things (IoT) device, a dedicated device made for a particular system or a targeted application, such as a training system or a website guidance and help system, or any other device capable of communicating over a communication channel.

Referring to FIG. 1, user 101 comprises of a sub module access website 105 according to some embodiments. Certain embodiments may require the user to login 110 to the server 102 that implements the methods and systems discussed in this application. According to certain embodiments, the server 102 further comprises a module to determine the validity of the login credentials illustrated in FIG. 1 as the decision block access granted 115. The user will be reverted back to access the server if the login credentials fail in the decision block access granted 115.

It will be understood that other embodiments may use different mechanisms to authenticate a user, such as using cookies, product codes, license codes, security token(s), authorization token(s) or challenge questions using registration information.

Referring to FIG. 1, according to some embodiment, once the user has been authenticated through the login credentials, the user may generate a connection request to the server 102 through the block illustrated in FIG. 1 as help request 120.

As illustrated in FIG. 1, according to some embodiments, the server 102, on receiving a connection request from a user, may establish a communication channel between the user and an operator by means of the submodule open channel 125 which communicates with the operator 103 and the operator as a response uses the submodule channel established 130 to establish the channel between the operator 103 and the user 101. The user in need of navigation help may generate a navigation request 135 to the server 102.

Referring to FIG. 1, on receiving an assistance request from the user in the sub module request received 140, the server may create a new instance of the user's screen by creating a copy of the user's visual in the sub module create new visual 145, and send the assistance request and the copy of the user's visual as the newly created instance to the operator 103 who will be able to see the user's screen through the sub module created visual received 150 according to some embodiments. The operator has the user instance available in order to provide the assistance but does not need access to the user's computer or data directly resulting in a more secure system.

According to some embodiments, the operator may analyse the assistance request and determine the next location, link or button that the user needs to click to navigate to the next item to get to the desired location. Once the location is determined by the operator, the operator may trigger an animation or an image to overlay at the appropriate location of the instance of the user's visual in the sub module animation triggered 155 and send a command or a set of commands to the server 102 to recreate the animation or image on the user's visual.

It will be understood that embodiments may use various types of animations to attract the attention of the user to the desired location. As an example only and not as a limitation, certain embodiments may use a simple image instead of an animation, such as a mouse pointer, highlighted text or object, or similar other mechanisms whereas other embodiments may use animations, such as pulsing circles, changing colors, moving arrows, stars, moving lines, shapes such as squares, diamonds, circles and stars, text whether or not highlighted, formatted or capitalized, or similar other mechanisms.

On receipt of the command from the operator to overlay an image or animation on the user's visual in the sub module command to recreate remote animation 160, the server may send a command or a set of commands to overlay and recreate the animation or image chosen by the operator on the user's visual, which may result in the animation or image being recreated on the user's screen as depicted in FIG. 1 sub module animation recreated 165 after receiving the command of set of commands from the server which originated from the operator.

Referring to FIG. 1, in some embodiments, the user may use a decision sub module request satisfied 170, to determine if the final desired location or subject has been reached for the current assistance query, else the process may continue with the new user visuals and new animations in different locations being shared between the user and the operator using the updated user screen instance created by the server.

FIG. 1 further illustrates another decision block need further help 175 to accommodate multiple navigation queries by the user according to some embodiments. Once all desired assistance has been rendered, the server will close the established channel through the sub module close channel 180.

Figure 2:
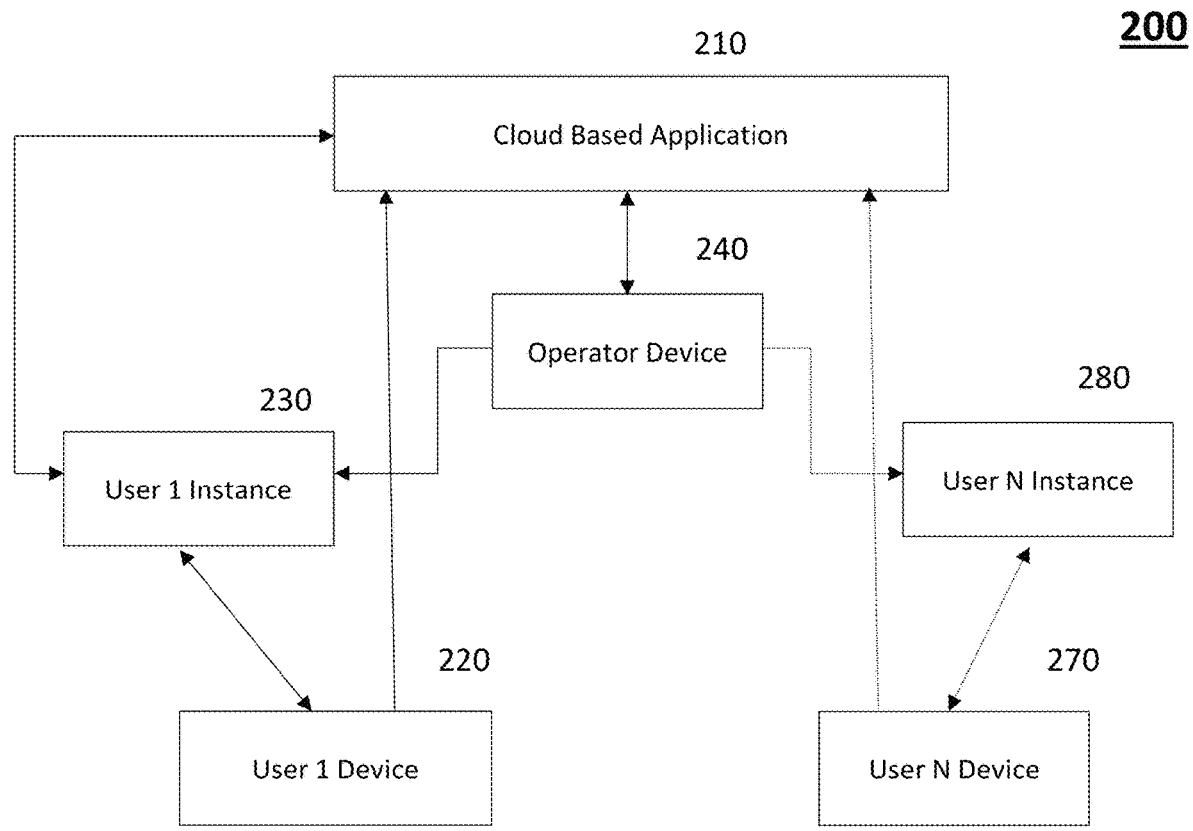
FIG. 2 is a simplified block diagram of a cloud based system 200 according to an embodiment.

FIG. 2 is a simplified block diagram of a cloud based system 200 according to an embodiment that may be used to assist users remotely in a secure manner. The system 200 comprises a cloud based application 210 which, according to certain embodiments, may be capable of connecting simultaneously to multiple users and operators. Referring to FIG. 2, the cloud based system 200 also comprises a User 1 Device 220 that maybe a computer, mobile device, a smartphone, a tablet, notebook, netbook, smart speaker, IoT device, or a dedicated appliance or apparatus used by a user for a specific purpose according to some embodiment. According to some embodiments, the cloud based system 200 further comprises an operator device 240 which may be used to assist the user using the user 1 device 220. A further component of the system, the user 1 instance 230, illustrated in FIG. 1 may be used in certain embodiments to create the secure instantiation of the user's device available to the operator device 240, thus enabling the user to receive assistance without any need for the operator device 240 to have any direct link with the user 1 device 220.

Referring to FIG. 2, according to an exemplary embodiment, which allows practice of the concepts disclosed in this application, the cloud based application 210 may enable an operator using the operator device 240 to assist users of the application. A user using the user 1 device 220 may connect to the cloud based application 210 and may request assistance with certain navigation within the application. As a response to the request, the cloud based application 210 may instruct the operator device 240 to provide the necessary assistance to the user. The cloud based application 210 may interact with the user 1 device 220 as a unique instance of the cloud based application represented by user 1 instance 230 and establish a communication channel between this unique instance and the operator device.

In such an embodiment, the operator may be able to receive the user's screen and/or current status, function or position that is of interest to the user at present time through the user 1 instance 230. Any assistance in the form of animation or image that is to be overlaid on the user 1 device 220 screen may be communicated to the user through the user 1 instance 230 without any direct link between the operator and the user. Once the user clicks on the relevant link, button, or selection on the user device, the user instance may update to show the updated user screen and may be passed on to the operator. The process may continue until the user has received the needed assistance at which time the channel between the operator and the instance of the user's application may be closed.

In certain embodiments, the server may provide additional details to create a copy for the user instance which include but are not limited to: screen size, url, device, browser, scroll position, dimensions (width and height), and history of actions they may have taken since the web session began.

In other embodiments, the server may create a copy of the user's visual on the operator device by sending a copy of an image which is a reproduction of the viewable web area from the browser within which the software or website is accessed where the means of sending the image may include but is not limited to any standard web protocol such as ftp, ftps, http, https, tcp, ump, scp, or shttp.

It will be understood that in other embodiments multiple users may be supported as illustrated by the user n device 270 and user u instance 280 in FIG. 1. In yet other embodiments, there may be multiple operator devices in conjunction with multiple user devices. It will be apparent to a person skilled in the arts that various mechanisms may be utilized to provide mechanisms for matching multiple operators with multiple users and to allocate the appropriate resources in the system to create the necessary multiple instances of the multiple user devices.

Still other embodiments may implement the secure communication mechanism by creating an instance of a user device which is in direct communication with an operator device but restrict the operator device's ability to pass any commands to the user device. This may be implemented by restricting the operator to pass a limited number of commands or having specific one-way data flow channels that restrict the operator device from making any changes to the client device except for sending commands to share certain animations or images to be shown on the user device. In such embodiments, the communication channels may do away with the middle layer server that was illustrated in FIG. 1.

Figure 3:
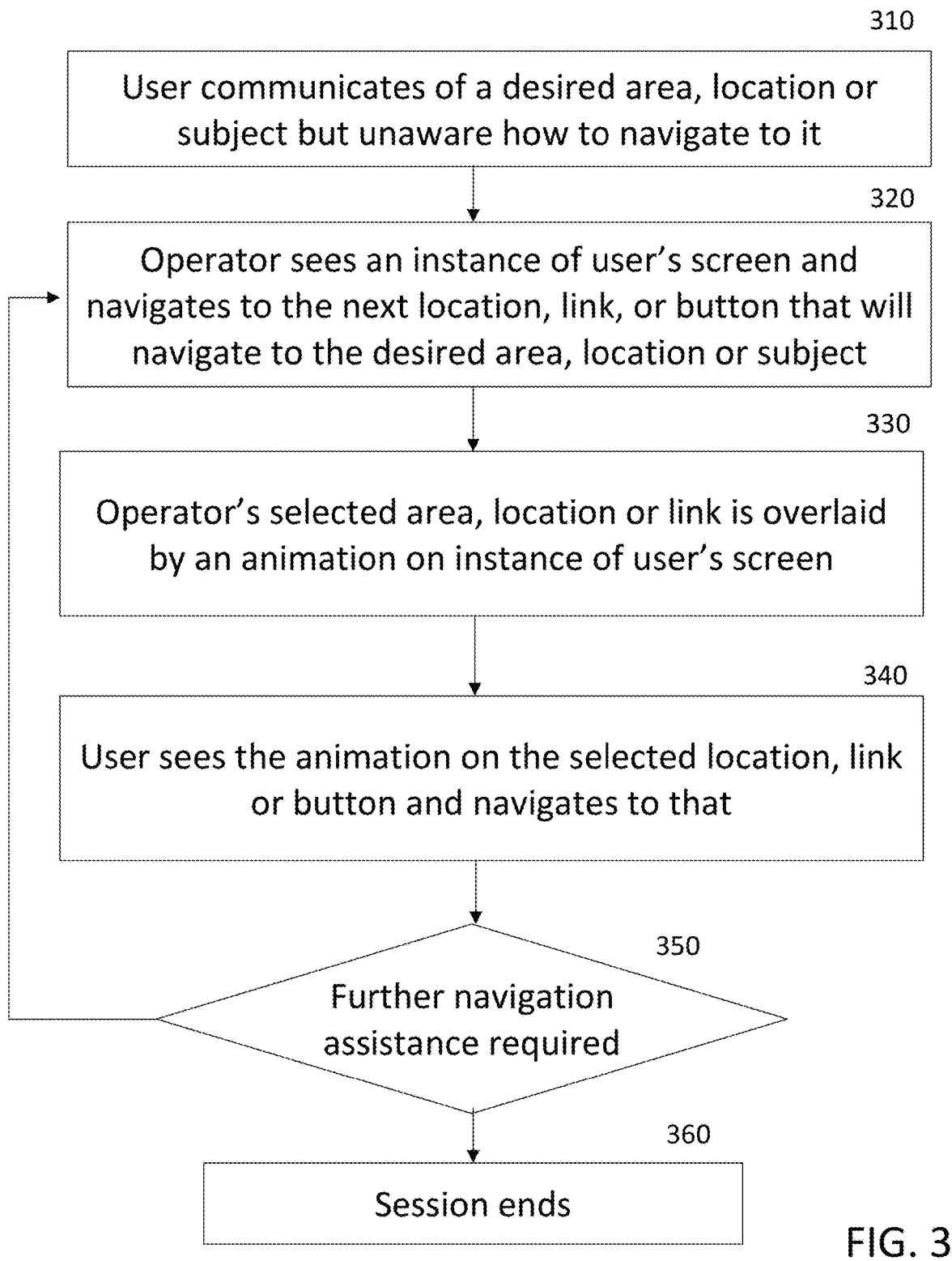
FIG. 3 is a flowchart illustrating the sub-blocks and steps involved in operating a system 300 for guiding a user to the desired location, link or button according to an embodiment.

FIG. 3 is a flowchart illustrating the sub-blocks and steps involved in operating a system 300 for guiding a user to the desired location, link, or button according to some embodiment. The flowchart in FIG. 3 comprises a block 310 that where the user may request assistance. The user may need assistance to access a desired area on a website or a function in a cloud based application, or may be unaware of how to get to a certain function, location, subject or some specific content.

The system 300, illustrated by the flowchart in FIG. 3, further comprises a block 320 in which the operator may receive the user's assistance request along with a copy of user's screen. According to some other embodiments, the user's assistance requests may be generated through a voice command through smart speaker, or a device capable of interfacing with a computer network by using voice commands and the primary communication channel may use such voice commands. Yet other embodiments may use a combination of input mechanisms for the user and operator to interact with each other. The operator may navigate to the next location, link, or button that the user may need to access to navigate to the next desired location, area, function, subject or content. The system further comprises a block 330 as illustrated in FIG. 3 where the operator's selected area may be communicated to the user. In certain embodiments, the location, link or the area that the operator selects or indicates may be overlaid by an animation on the user instance screen thus drawing user's attention to that particular location.

Referring to FIG. 3, the system further comprises a block 340, according to some embodiment, where the user may be drawn to the animation generated over the screen area selected by the operator. Certain embodiments may incorporate automatic targeting by using the X-Y coordinates selected by the operator to automatically select the nearest object and accordingly adjust the overlaid image or animation to target the appropriate web object of interest to the user.

Embodiments may save the work flow from every session in a database that may enable such embodiments to implement automated assistance systems wherein the previous sessions may be used to train the system to automatically answer an assistance request from a user from a preset step of navigation assistance from such a database with the database being continuously updated with learnings from the previous sessions. Some embodiments may use the coordinates used by the operator to map to the relevant objects in proximity to the selected coordinates to train the system.

Still other embodiments may use a hybrid of the automated and operator assisted mechanisms. Still other embodiments may save the complete workflow to be used for future assistance requests.

Yet other embodiments may provide for mechanisms that allow for such saved work flows to be automatically updated when the website or cloud based application is updated to a new version wherein the relevant links may be uncoupled or coupled to new objects in the navigation path as needed for the updated website or application.

In certain embodiments, the animation overlaid on the user instance may be automatically removed once the user selects the link, button, or location emphasized by the animation to navigate to the desired location, subject, or content, whereas in other embodiments the user may take an affirmative action to remove the emphasis, such as clicking on the animation itself, or in yet other embodiments, the user may just select the next location or area that the user may need assistance with and the animation or emphasis on the previous location may be removed as a result of that.

Referring to FIG. 3, in certain embodiments, a decision block 350 may be included wherein the navigation assistance may be provided in a continuous and iterative manner unless all assistance on the subject, content or application that is sought by the user has been provided. In case the user needs further assistance, the functions represented by the blocks 320, where the operator may receive user's next assistance request and user's visual, 330 where the operator's emphasized area may be communicated to the user, and 340 where the user's attention is drawn to particular area selected by the operator, may be repeated until all assistance needed by the user has been provided in the session.

Once the user does not require any further assistance, the session may be closed as illustrated by block 360 in FIG. 3. According to some embodiments, the operation of closing the session may amount to closing the established channel between the operator and the user instance, whereas in other embodiments, it may further include freeing up the user instance itself in addition to closing the established channel and releasing all the resources associated with creating the user instance. It would be understood that embodiments may provide for varied mechanisms to close the channel where the request to close the connection may originate as a request from the user, operator, the server or the application, via logoff by user, end of chat session or other mechanisms or once the desired assistance has been provided.

In certain embodiments the mechanism to draw user's attention to the button, link or location may be an image, highlight or an animation, such as a pulsating circular animation. In certain embodiments, these images, highlight or animations may be predefined and may be stored in a library available to the operator, whereas in other embodiments they may be transferred to the user instance as data, whereas in still other embodiments they may be created as a result of commands to the user's device to create such an object on the user's screen at a particular location using the highest z-index so that the object remains overlaid on top of the visible layer on screen. It would be understood that in yet other embodiments, such objects may by created by the operator in real time to share with the user. In other embodiments, the emphasis may be created by use of animations or images that may be composite of multiple images or animations.

It will be understood that the user's screen that is shared with the operator may not be the user's full screen but only the relevant portion of the user's screen, such as the user's web browser window or a particular tab on user's web browser, or a window on user's computer that may be relevant to the specific application, web site or cloud repository that the user needs assistance with. In other embodiments, the relevant information shared with the operator may be a layout of web objects that may have redacted elements or pseudonymized fields to anonymize the user private data, or certain data within the shared information may be entirely omitted.

FIG. 4 is a flowchart illustrating the steps involved in an exemplary method 400 that may be implemented by a service provider that provides cloud based services through its website or a cloud based application. The method 400 illustrates how a method to assist a user may be implemented through the use of animation on user's screen to quickly draw user's attention to the desired location, button, link or function according to some embodiment. The method 400 comprises of a block 410 where a user may access a website or a cloud based application. In certain embodiments the access may require the user to provide credentials for verification, such as login or application based registration code, a security token, or an authorizations token. According to certain embodiments, method 400 may further comprise a block 420 which represents the user being unsure of how to access certain function, content, or how to proceed within a set of steps to use certain functionality. In other embodiments, the same method may be used to provide training or distributing educational content to users of the website or cloud based application.

Referring to FIG. 4, block 440 in method 400 may facilitate the user communication with a representative who may be available to assist or help train the user. The company representative may target an instance of the web based content or application that may be a unique instance only viewable by the user and accessible by the company representative. In certain embodiments, the user instance may be automatically created along with a communication channel being established between the user and the company representative with any such user instance being tied to the user's login credentials. It will be understood that multiple users may be using multiple unique instances of the website or cloud based application with the current interactions between the user and the web site or application targeting different content, function or execution points.

Referring to FIG. 4, block 450 in method 400 may facilitate the company representative to draw the user's attention to a specific location of the user instance screen, a link, a button, or specific content that the user desired to access or what may be the next step of the navigation to provide user access to the content, function, or location for which the user requested the help. According to some embodiments, when the company representative clicks on a certain desired location to help draw the user's attention, it may result in a command to draw an image or animation around that location as illustrated by block 460 in FIG. 4. According to some embodiment, company representative's click on a certain location may be converted into a command or a set of commands to render an image or animation at that location of the screen, such location may be referenced by means of the (X,Y) coordinates of the screen location. According to some embodiment, in addition the command to render such image or animation may further choose a z-index to be of the highest priority as compared to the other visual elements to ensure that the image or animation remains overlaid on top of any other visual elements and display layers on the user instance screen. System may render image or animation referencing the (X,Y) coordinates of the link or object at the corner or end point of the link or object suitable for the image or animation used. Z coordinate used may be an index chosen with the highest priority making the image or animation the most visible of all links, objects, or text within the website or application, creating an overlay effect.

Referring again to FIG. 4, according to some embodiments, method 400 may further comprise of a block 470 to transfer any such created image or animation in block 460 to the user through the same channel that was established in block 430. As a consequence, the user may see the image or animation drawing the user's attention to the particular location that the user may need to access or click next as represented by block 480, which may change the user's context on the web site or cloud based application, navigating the user to the next desired location, function, content, or step.

The exemplary method 400 illustrated in FIG. 4 may be implemented repetitively in a loop as represented by block 490 until the desired tasks have been completed or the assistance requested by the user has been completed. In other embodiments the method may be a training process where the same steps may be repeated to provide user visual guides as a learning exercise in navigating various functions and components of a cloud based application.

It will be understood that though the exemplary method 400 describes the operator to be a company representative, the same mechanisms may be used in other embodiments where anyone using the same software or system may request help from other users of the same software or system. Requests may be queued into a round robin system and allocated to qualified individuals creating an ecosystem where users, the software owner, or the ecosystem owner may reward other users for on-demand help in form of credits, cash, or any other resources valued by the users of the software or system. The methods and systems disclosed herein may be further utilized to lower customer service burden by enabling users to provide assistance to each other.

Apparatus, methods and systems according to embodiments of the disclosure are described. Although specific embodiments are illustrated and described herein, it will be appreciated by those of ordinary skill in the art that any arrangement which is calculated to achieve the same purposes can be substituted for the specific embodiments shown. This application is intended to cover any adaptations or variations of the embodiments and disclosure. For example, although described in terminology and terms common to the field of art, exemplary embodiments, systems, methods and apparatus described herein, one of ordinary skill in the art will appreciate that implementations can be made for other fields of art, systems, apparatus or methods that provide the required functions. The invention should therefore not be limited by the above described embodiment, method, and examples, but by all embodiments and methods within the scope and spirit of the invention.

In particular, one of ordinary skill in the art will readily appreciate that the names of the methods and apparatus are not intended to limit embodiments or the disclosure. Furthermore, additional methods, steps, and apparatus can be added to the components, functions can be rearranged among the components, and new components to correspond to future enhancements and physical devices used in embodiments can be introduced without departing from the scope of embodiments and the disclosure. One of skill in the art will readily recognize that embodiments are applicable to future systems, future apparatus, future methods, and different materials.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein.

Terminology used in the present disclosure is intended to include all environments and alternate technologies that provide the same functionality described herein.

The invention claimed is:

1. A method comprising:
   receiving a connection request from a user device;
   creating an operator instance on one or more servers, separate from the user device and user instance on the one or more servers, associated with an operator device;
   establishing a communication channel between the user instance and the operator instance;
   creating an operator instance visual to be a copy of a user instance visual;
   restricting commands from the operator instance to a list of commands to create an overlay or change the user instance visual;
   sending one or more commands as required to keep the operator instance visual to be a copy of the user instance visual;
   receiving an animation command from the operator instance;
   sending a command to overlay the animation on the user instance; and
   closing the established communication channel.

2. The method of claim 1 further comprising step of receiving an assistance request from the user instance after the step of establishing a communication channel between the user instance and the operator instance.

3. The method of claim 1 wherein the method steps receiving an animation command from the operator instance and sending a command to overlay the animation on the user instance are performed repetitively prior to the step of closing the established communication channel.

4. The method of claim 1 wherein the step of sending a command to overlay the animation on the user instance further comprises a higher z-index.

5. The method of claim 1 wherein the step of sending a command to overlay the animation on the user instance further comprises a set of coordinates for the animation.

6. The method of claim 1 wherein the step of establishing a communication channel between the user instance and the operator instance requires the user instance providing a login credential.

7. The method of claim 1, wherein the animation comprises predefined animations.

8. The method of claim 1, further comprising: the step creating the user instance, wherein the user instance is associated with the user device.

9. A system comprising:
   a cloud based server;
   a user computer;
   an operator computer;
   a communication channel interconnecting the user computer, the server and the operator computer;
   an application running on the server configured to:
      receive a connection request from the user computer;

establish a communication channel with the operator computer;
create a separate operator instance of a screen of the user computer on the cloud based server;
create an operator instance visual to be a copy of a user instance visual;
restrict commands from the operator instance to a list of commands to create an overlay or change the user instance visual;
send one or more commands as required to keep the operator instance visual to be a copy of the user instance visual;
receive a command from the operator computer to create an animation on the user's computer;
send a command in order to add the animation on the user's computer; and
close the established communication channel.

10. The system of claim 9 wherein the user computer is a mobile device.

11. The system of claim 9 wherein the communication channel interconnecting the user computer, the server and the operator computer is the internet.

12. The system of claim 9 wherein the communication channel interconnecting the user computer, the server and the operator computer is a local area network.

13. The system of claim 9 wherein the communication channel interconnecting the user computer, the server and the operator computer is a wireless network.

14. The system of claim 9 wherein the cloud based server is replaced with a system connected to the user computer and the operator computer through a local area network.

15. A method comprising:
receiving a connection request from a user at a server;
creating a separate instance of a user instance visual on the server;
establishing a communication channel between the user and an operator through the separate instance on the server;
creating a separate instance visual to be a copy of the user instance visual;
restricting commands from the operator to a list of commands to create an overlay or change the user instance visual;
sending one or more commands as required to keep the separate instance visual to be a copy of the user instance visual;
receiving an animation command from the operator at the server;
sending a command from the server to overlay the animation on the user instance visual; and
closing the established channel.

16. A method comprising:
receiving a connection request from a user device;
creating an operator instance on one or more servers, separate from the user device and user instance on the one or more servers, associated with an operator device;
establishing a communication channel between the user instance and the operator instance to send commands between the user instance and the operator instance;
creating an operator instance visual to be a copy of a user instance visual;
restricting commands from the operator instance to a list of commands to create an overlay or change the user instance visual;
sending one or more commands as required to keep the operator instance visual to be a copy of the user instance visual;
receiving an animation command from the operator instance;
sending a command to overlay the animation on the user instance; and
closing the established communication channel.

17. The method of claim 16, said established communication channel limited to sending and receiving commands between the user instance and the operator instance.

18. The method of claim 16, said established communication channel used to send commands with data parameters between the user instance and the operator instance;
said method further comprising:
omitting non-command data.

19. The method of claim 16 further comprising iteration of the steps of receiving an animation command from the operator instance and sending a command to overlay the animation on the user instance prior to closing the established communication channel.

20. The method of claim 16, the step of sending a command to overlay the animation on the user instance further comprising a set of coordinates for the animation.

* * * * *